United States Patent [19]

Shinohara et al.

[11] Patent Number: 4,586,996
[45] Date of Patent: May 6, 1986

[54] SURFACE HARDNER FOR NYLON LENS

[75] Inventors: Kazuhiro Shinohara; Shunzo Abe; Hideo Miyake, all of Otsu, Japan

[73] Assignee: Toyo Boseki Kabushiki Kaisha, Japan

[21] Appl. No.: 642,863

[22] Filed: Aug. 21, 1984

[30] Foreign Application Priority Data

Aug. 29, 1983 [JP] Japan ................... 58-158485

[51] Int. Cl.$^4$ .................. C08F 2/50; C08F 30/08; G02C 7/04
[52] U.S. Cl. ...................... 522/7; 351/166; 428/447; 428/475.5
[58] Field of Search ............ 204/159.13; 351/166; 428/447, 475.5

[56] References Cited

U.S. PATENT DOCUMENTS 4,504,231 3/1985 Koblitz et al. ............ 204/159.13

Primary Examiner—Jacob Ziegler
Attorney, Agent, or Firm—Jones, Tullar & Cooper

[57] ABSTRACT

A surface hardner for nylon lens comprising (a) a polyfunctional acrylic ester monomer, (b) a photoinitiator, and (c) a diluent, said photoinitiator consisting of a combination of a hydrogen abstraction type photoinitiator and an α-cleavage type photoinitiator, and optionally a silane compound containing at least one polymerizable unsaturated bond. Said surface hardner is effective for giving the nylon lens excellent impact resistance and wear resistance, and when the silane compound is incorporated, it can give also an excellent adhesion between the hardner layer and nylon lens.

3 Claims, No Drawings

SURFACE HARDNER FOR NYLON LENS

The present invention relates to a hardner for hardening the surface of nylon lens which has an excellent impact resistance and wear resistance.

Recently, plastic products prepared from polymethyl methacrylate or polycarbonate have been utilized in various fields, in which glass products have been used, in view of their excellent transparency and processability and also low cost. For example, they are useful as a replacement of glass products such as lens, plates, formed products. However, plastic lens prepared from a plastic such as polymethyl methacrylate or polycarbonate has less impact resistance, and hence, it is required to be made thick in order to increase the impact resistance thereof.

On the other hand, nylon lens have superior impact resistance and hence can be made thiner in thickness than the lens of polymethyl methacrylate or polycarbonate. Accordingly, nylon lens is suitable for mass-volume production of various lenses such as dioptic lens, lens for sunglasses, fashion glasses, or glasses for industries (e.g. protecting glasses) and has been tried to use in practice. However, the nylon lens is usually inferior in less surface hardness, less wear resistance, and hence the surface thereof is easily injured by contact with substances, scratching or impact, which results in deterioration of appearance and optical properties, which are fatal defects in view of lowering of product value. In order to eliminate such drawbacks, there have been proposed various methods for improving the surface hardness of plastic lenses so as to give them wear resistance.

It is known that when nylon lens is subjected to surface-hardening treatment, it usually decreases largely impact resistance. On the other hand, when the impact resistance is sufficient, it is inferior in wear resistance and the surface thereof is easily injured. Accordingly, it has been required to develope a surface hardner for nylon lens which satisfies both requirements of improving the impact resistance and the wear resistance.

As a result of the extensive studies of the present inventors on an improved surface hardner for nylon lens, it has been found that the desired surface hardner can be obtained by using as a photoinitiator a specific combination of photoinitiators, i.e. a combination of a hydrogen abstraction type photoinitiator and an α-cleavage type photoinitiator.

An object of the present invention is to provide an improved surface hardner suitable for hardening the surface of nylon lens. Another object of the invention is to provide a surface hardner which can give both excellent impact resistance and excellent wear resistance. A further object of the invention is to provide a surface hardner for nylon lens containing a combination of a hydrogen abstraction type photoinitiator and an α-cleavage type photoinitiator as a photoinitiator in a hardner composition. These and other objects and advantages of the present invention will be apparent to those skilled in the art from the following description.

The surface hardner of the present invention is an active ray-curable composition for hardening the surface of nylon lens comprising (a) a polyfunctional acrylic ester monomer, (b) a photoinitiator, and (c) a diluent, which is characteristic in that a combination of hydrogen abstraction type photoinitiator and an α-cleavage type photoinitiator is incorporated as the photoinitiator. The surface hardner of the present invention may optionally be incorporated as a fourth component a silane compound having at least one polymerizable unsaturated bond. The surface hardner of the present invention can give excellent impact resistance and wear resistance to nylon lens which has never been obtained by using the conventional hardners. Besides, by incorporation of the silane compound into the hardner, there can be given largely increased adhesion between the hardner layer and nylon lens.

The nylon lens to which the surface hardner of the present invention is applied is prepared from polyamide resins polymerized with for example a diamine component and a dicarboxylic acid component.

The diamine component includes hexamethylenediamine, trihexamethylenediamine, metaxylylenediamine, bis(4-aminocyclohexyl)methane, bis(4-amino-3-methylcyclohexyl)-methane, or the like. The dicarboxylic acid component includes isophthalic acid, terephthalic acid, adipic acid, sebacic acid, dodecanedionic acid, or the like. Suitable examples of the combination of the diamine component and dicarboxylic acid component are a combination of trihexamethylenediamine and terephthalic acid, a combination of bis(4-aminocyclohexyl)methane and isophthalic acid, a combination of bis(4-amino-3-methylcyclohexyl)methane and terephthalic acid, a combination of hexamethylenediamine and terephthalic acid, and a combination of metaxylylenediamine and dodecanedionic acid.

Besides, the nylon lens may be prepared by using a polyamide polymerized with an aminocarboxylic acid component such as ε-caprolactone, 11-aminoundecanic acid, ω-laurolactam, or the like, or a copolymer of these component.

The nylon lens having a light permeability of 90% at the visible area is usually used.

The polyfunctional acrylic ester monomer (a) used in the hardner of the present invention includes any monomer which can be cured by irradition of an active ray when a hardner layer is formed on the surface of nylon lens, but is preferably a monomer having at least two acryloyloxy or methacryloyloxy group in the molecule in view of the properties of hardner layer after hardened. Suitable examples are ethyleneglycol di(meth)acrylate (the parenthesis means that both of acrylate and methacrylate are included, hereinafter the same), 1,3-propanediol di(meth)acrylate, 1,4-butanediol di(meth)acrylate, 1,6-hexanediol di(meth)acrylate, diethyleneglycol di(meth)acrylate, neopentylglycol di(meth)acrylate, trimethylolethane tri(meth)acrylate, trimethylolpropane tri(meth)acrylate, pentaerythritol tri(meth)acrylate, pentaerythritol tetra(meth)acrylate, dipentaerythritol hexa(meth)acrylate, or the like. Among these, preferred examples are trimethylolpropane triacrylate, pentaerythritol triacrylate, pentaerythritol tetraacrylate, and dipentaerythritol hexaacrylate. These monomers are used alone or in combination of two or more thereof. Other oligomers or polymers may optionally be used together with the polyfunctional acrylic ester monomer.

The most important characteristic of the present invention is to use a combination of a hydrogen abstraction type photoinitiator and an α-cleavage type photoinitiator. When these photoinitiators are each used alone, the desired effect can not be achieved.

Suitable examples of the hydrogen abstraction type photoinitiator are anthraquinones (e.g. 9,10-anthraquinone, 1-chloroanthraquinone, 2-methylanthraquinone, 2-ethylanthraquinone), benzophenones (e.g. benzophenone, p-chlorobenzophenone, p-dimethylaminobenzophenone), benzoylformates (e.g. methyl benzoylformate, ethyl benzoylformate, propyl benzoylformate, t-butyl benzoylformate), dibenzosuberones (e.g. dibenzosuberone, 2-chlorodibenzosuberone, 2,4-dichlorodibenzosuberone), benzils (e.g. benzil, 2-chlorobenzil, 2,4-dichlorobenzil), and xanthones (e.g. 2,4-dimethylxanthone, 2,4-diethylxanthone, 2-chloroxanthone). Suitable examples of the α-cleavage type photoinitiator are ketals (e.g. benzil dimethyl ketal, benzil diethyl ketal, benzil dipropyl ketal), benzoins (e.g. benzoin methyl ether, benzoin ethyl ether, benzoin isopropyl ether, benzoin, α-methylbenzoin), and phenones (e.g. p-isopropyl-α-hydroxyisobutylphenone, α-hydroxyisobutylphenone). Suitable combination of the hydrogen abstraction type photoinitiator and the α-cleavage type photoinitiator are a combination of benzil/benzoin, benzil/benzil dimethyl ketal, methyl benzoylformate/benzil dimethyl ketal, dibenzosuberone/benzoin, and dibenzosuberone/benzil dimethyl ketal. More preferred combination is a combination of methyl benzoylformate/benzil dimethyl ketal.

In the combination, the molar ratio of the hydrogen abstraction type photoinitiator/the α-cleavage type photoinitiator is in the range of 0.2 to 3.0, preferably 0.4 to 2.0, more preferably 0.5 to 1.5. The photoinitiators are used in an amount of 0.1 to 15 parts by weight, preferably 0.5 to 10 parts by weight, more preferably 1 to 5 parts by weight, to 100 parts by weight of the polyfunctional acrylic ester monomer. When the photoinitiators are used in an amount of less than 0.1 part by weight, the polyfunctional acrylic ester monomer can not sufficiently be cured, which results in lowering of the wear resistance of the hardner layer. On the other hand, when the amount of the photoinitiators is over 15 parts by weight, the impact resistance and weatherability of the hardner layer.

The diluent (c) used in the present invention should dissolve both the polyfunctional acrylic ester monomer and the photoinitiators. The diluent includes organic solvents such as esters, ketones, aromatic hydrocarbons, alcohols, and ethers. Suitable examples of the diluent are benzene, toluene, xylene, isopropyl alcohol, cellosolves. These diluents may be used alone or in combinations of two or more thereof. The amount of the diluent is not critical but is sufficient in that the polyfunctional acrylic ester monomer and the photoinitiators can be dissolved. The dilutent is usually used in an amount of 10 to 1000 parts by weight to 100 parts by weight of the polyfunctional acrylic ester monomer.

The surface hardner of the present invention may optionally be incorporated with a silane compound containing at least one polymerizable unsaturated bond, by which the adhesion of the hardner layer to nylon lens is improved. Suitable examples of the silane compound are allyl group-containing silane compounds (e.g. allyldimethylchlorosilane, allyldimethylsilane, allyltriethoxysilane, diallyldimethylsilane, diphenyldiallylsilane, tetraallyloxysilane, triethoxysilylpropylallylamine), vinyl group-containing silane compounds (e.g. vinyldiemthylethoxysilane, vinyldimethylchlorosilane, vinylmethyldiacetoxysilane, vinylmethyldichlorosilane, vinyltriethoxysilane, vinyltris(β-methoxyethoxy)silane, vinylmethyldiethoxysilane, vinyloxytrimethylsilane, divinyldiethoxysilane, 1,3-divinyltetraethoxydisilane, trivinylethoxysilane, trivinylmethylsilane), (meth)acryloyl group-containing silane compounds (e.g. α-methacryloyloxymethyltrimethoxysilane, α-acryloyloxymethyltrimethoxysilane, β-methacryloyloxyethyltrimethoxysilane, β-acryloyloxyethyltrimethoxysilane, γ-methacryloyloxypropyltrimethoxysilane, γ-acryloyloxypropyltrimethoxysilane, dimethacryloyldiphenylsilane). Among them, the preferred compounds are (meth)acryloyl group-containing silane compounds, and particularly preferred compounds are γ-methacryloyloxypropyltrimethoxysilane and γ-acryloyloxypropyltrimethoxysilane. The silane compound is preferably used in an amount of 0.1 to 10% by weight, more preferably 0.5 to 5% by weight, based on the weight of the resin component comprising the polyfunctional acrylic ester monomer.

The surface hardner of the present invention may also optionally be incorporated with various other additives such as surface lubricants, antistatics, ultraviolet adsorbers, defoaming agents, or the like.

When the nylon lens is coated with the surface hardner of the present invention, the nylon lens is preferably previously subjected to pretreatment, such as washing with a solvent, ultrasonic cleaning with an aqueous surfactant solution or ion exchange water, or washing with vapor of a solvent in order to obtain an evenly hardened layer having beautiful appearance.

The surface hardner of the present invention is applied to the nylon lens by conventional methods, such as immersing method, spray method, or the like. The hardner is coated in a thickness (after hardened) of 1 to 30 μm, preferably 2 to 20 μm. When the thickness of the hardner layer is less than 1 μm, the layer has insufficient wear resistance, and on the other hand, when the thickness is over 30 μm, undesirable cracking tends to occur in the hardner layer and to show lowering of the impact resistance and optical characteristics.

After applying the surface hardner of the present invention to the surface of the nylon lens, the coating layer is hardened by irradiation of ultraviolet ray in a wave length of 200 to 400 nm or with radiation (e.g. electron rays). In case of hardening with a ultraviolet ray, it is preferably carried out in an atmosphere of an inert gas (e.g. nitrogen, carbon dioxide). The irradiation of the active rays such as ultraviolet rays is preferably carried out without heat treatment or forcible drying of the nylon lens coated with the hardner of the present invention.

The nylon lens covered with the hardner layer of the present invention shows largely improved impact resistance and wear resistane and further excellent adhesion in case of incorporating a silane compound having at least one polymerizable unsaturated bond into the hardner, and hence, can be used in various fields of lens such as dioptic lens, lens for sunglasses, fashion glasses, or protecting glasses.

The present invention is illustrated by the following Examples and Reference Examples, but should not be construed to be limited thereof. In Examples and Reference Examples, various properties were measured by the following methods.

Test of impact resistance: A steel ball (530 g) was dropped on the nylon lens, and there was measured the minimum height of the ball at which the nylon lens was broken.

Test of wear resistance: The nylon lens was rubbed with a steel wool #0000 with a load of 1 kg 30 times, and then the degree of injury was observed.

Test of adhesion: The coated surface of the lens was cross-cut each with 11 lines of longitudinal lines and lateral lines each with a width of 1 mm, and the crooscut surface was tightly covered with a cellophane tape (Cellotape, manufactured by Nichiban K.K.), and then the cellophane tape was peeled off. The number of squares remained without being peeled off was counted. The test was done once or repeatedly.

Pencil hardness: The coated surface of the lens was rubbed with a pencil (Mitsubishi UNI, manufactured by Mitsubishi Pencil) at an angle of 45°, and there was observed whether the surface was injured or not.

Besides, in Examples and Reference Examples, "part" means part by weight.

EXAMPLE 1

A nylon lens (thickness: 1.5 mm, prepared from Polyamide resin T-714, manufactured by Toyo Boseki K.K.) is immersed in a surface hardner consisting of pentaerythritol tetraacrylate (40 parts), methyl benzoylformate (0.5 part), benzil dimethyl ketal (0.5 part) and toluene (60 parts), and thereby, the surface of the nylon lens is coated with the surface hardner. The coated lens is dried at room temperature for 5 minutes and irradiated with a 80 W/cm high pressure mercury light from a distance of 15 cm for 45 seconds in an inert gas, wherein the irradiation is carried out from both sides of the concave surface and convex surface of the lens simultaneously, by which the coating layer is hardened.

The properties of the nylon lens having a hardner layer on the surface were measured. The results are as follows.
Impact resistance: 70 cm
Wear resistance: No injury
Adhesion test: 100/100 (one time test)
Pencil hardness: 2H–3H

EXAMPLE 2

In the same manner as described in Example 1, a nylon lens is coated with a surface hardner, and the nylon lens having a hardner layer is irradiated likewise for 80 seconds without being dried at room temperature.

The properties of the nylon lens thus obtained are as follows:
Impact resistance: 95 cm
Wear resistance: No injury
Adhesion test: 100/100 (one time test)
Pencil hardness: 3H

REFERENCE EXAMPLE 1

The same nylon lens (thickness: 1.5 mm) as used in Example 1 is immersed in a surface hardner consisting of pentaerythritol tetraacrylate (40 parts), methyl benzoylformate (1 part) and toluene (60 parts). After drying at room temperature for 5 minutes, the coating layer is hardened in the same manner as described in Example 1.

The properties of the nylon lens having a hardner layer on the surface were measured. The results are as follows.
Impact resistance: 45 cm
Wear resistance: Injury occurred
Adhesion test: 100/100 (one time test)
Pencil hardness: 2H

REFERENCE EXAMPLE 2

The same nylon lens (thickness: 1.5 mm) as used in Example 1 is immersed in a surface hardner consisting of pentaerythritol tetraacrylate (40 parts), benzil dimetyl ketal (1 part) and toluene (60 parts). The coating layer is hardened in the same manner as described in Example 2 without drying at room temperature.

The properties of the nylon lens having a hardner layer on the surface were measured. The results are as follows.
Impact resistance: 20 cm
Wear resistance: No injury
Adhesion test: 100/100 (one time test)
Pencil hardness: 3H

EXAMPLE 3

The same nylon lens (thickness: 1.5 mm) as used in Example 1 is immersed in a surface hardner consisting of pentaerythritol tetraacrylate (40 parts), benzil (0.5 part), benzil dimetyl ketal (0.5 part) and toluene (60 parts). The coating layer is hardened in the same manner as described in Example 1 without drying at room temperature.

The properties of the nylon lens having a hardner layer on the surface were measured. The results are as follows.
Impact resistance: 75 cm
Wear resistance: No injury
Adhesion test: 100/100 (one time test)
Pencil hardness: 2H–3H

EXAMPLE 4

In the same manner as described in Example 3, the nylon lens is coated with the same surface hardner. After drying at room temperature for 5 minutes, the coating layer is likewise hardened by irradiation for 35 seconds.

The properties of the nylon lens having a hardner layer on the surface were measured. The results are as follows.
Impact resistance: 65 cm
Wear resistance: No injury
Adhesion test: 100/100 (one time test)
Pencil hardness: 2H–3H

REFERENCE EXAMPLE 3

The same nylon lens (thickness: 1.5 mm) as used in Example 1 is immersed in a surface hardner consisting of pentaerythritol tetraacrylate (40 parts), benzil (1 part) and toluene (20 parts). After drying at room temperature for 5 minutes, the coating layer is hardened in the same manner as described in Example 4.

The properties of the nylon lens having a hardner layer on the surface were measured. The results are as follows.
Impact resistance: 25 cm
Wear resistance: Injury occurred
Adhesion test: 100/100 (one time test)
Pencil hardness: 2H

REFERENCE EXAMPLE 4

In the same manner as described in Reference Example 3, the nylon lens is coated with the same surface hardner. The coating layer is hardened in the same manner as described in Example 3 without drying at room temperature.

The properties of the nylon lens having a hardner layer on the surface were measured. The results are as follows.
Impact resistance: 35 cm
Wear resistance: No injury
Adhesion test: 100/100 (one time test)
Pencil hardness: 2H

EXAMPLE 5

The same nylon lens (thickness: 1.5 mm) as used in Example 1 is immersed in a surface hardner consisting of pentaerythritol tetraacrylate (40 parts), benzil dimethylketal (0.5 part), dibenzosuberone (0.5 part) and toluene (60 parts). After drying at room temperature for 5 minutes, the coating layer is hardened in the same manner as described in Example 1.

The properties of the nylon lens having a hardner layer on the surface were measured. The results are as follows.
Impact resistance: 55 cm
Wear resistance: No injury
Adhesion test: 100/100 (one time test)
Pencil hardness: 2H-3H

REFERENCE EXAMPLE 5

The same nylon lens (thickness: 1.5 mm) as used in Example 1 is immersed in a surface hardner consisting of pentaerythritol tetraacrylate (40 parts), dibenzosuberone (1 part) and toluene (60 parts). After drying at room temperature for 5 minutes, the coating layer is hardened in the same manner as described in Example 1.

The properties of the nylon lens having a hardner layer on the surface were measured. The results are as follows.
Impact resistance: 35 cm
Wear resistance: Injury occurred
Adhesion test: 100/100 (one time test)
Pencil hardness: 2H

EXAMPLE 6

The same nylon lens (thickness: 1.5 mm) as used in Example 1 is immersed in a surface hardner consisting of pentaerythritol tetraacrylate (20 parts), dipentaerythritol hexaacrylate (20 parts), methyl benzoylformate (0.5 part), benzil dimethyl ketal (0.5 part) and toluene (60 parts). The coating layer is hardened in the same manner as described in Example 2 without being dried at room temperature.

The properties of the nylon lens having a hardner layer on the surface were measured. The results are as follows.
Impact resistance: 50 cm
Wear resistance: No injury
Adhesion test: 100/100 (one time test)
Pencil hardness: 3H

REFERENCE EXAMPLE 6

The same nylon lens (thickness: 1.5 mm) as used in Example 1 is immersed in a surface hardner consisting of pentaerythritol tetraacrylate (20 parts), dipentaerythritol hexaacrylate (20 parts), methyl benzoylformate (1 part) and toluene (60 parts). The coating layer is hardened in the same manner as described in Example 2 without being dried at room temperature.

The properties of the nylon lens having a hardner layer on the surface were measured. The results are as follows.
Impact resistance: 25 cm
Wear resistance: No injury
Adhesion test: 100/100 (one time test)
Pencil hardness: 3H

REFERENCE EXAMPLE 7

The same nylon lens (thickness: 1.5 mm) as used in Example 1 is immersed in a surface hardner consisting of pentaerythritol tetraacrylate (20 parts), dipentaerythritol hexaacrylate (20 parts), benzil dimethyl ketal (1 part) and toluene (60 parts). The coating layer is hardened in the same manner as described in Example 2 without being dried at room temperature.

The properties of the nylon lens having a hardner layer on the surface were measured. The results are as follows.
Impact resistance: 20 cm
Wear resistance: Injury occurred
Adhesion test: 100/100 (one time test)
Pencil hardness: 3H In order to make clearer the differences between Examples 1 to 6 and Reference Examples 1 to 7 in the impact resistance, wear resistance, adhesion and pencil hardness, these data are summarized in Table 1.

TABLE 1

| Ex. No. | Impact resistance (cm) | wear resistance | Adhesion | hardness |
|---|---|---|---|---|
| Ex. 1 | 70 | No injury | 100/100 | 2H-3H |
| Ex. 2 | 95 | " | " | 3H |
| Ex. 3 | 75 | " | " | 2H-3H |
| Ex. 4 | 65 | " | " | " |
| Ex. 5 | 55 | " | " | " |
| Ex. 6 | 50 | " | " | 3H |
| Ref. Ex. 1 | 45 | Injury occurred | 100/100 | 2H |
| Ref. Ex. 2 | 20 | No injury | " | 3H |
| Ref. Ex. 3 | 25 | Injury occurred | " | 2H |
| Ref. Ex. 4 | 35 | No injury | " | " |
| Ref. Ex. 5 | 35 | Injury occurred | " | " |
| Ref. Ex. 6 | 25 | No injury | " | 3H |
| Ref. Ex. 7 | 20 | Injury occurred | " | " |

EXAMPLE 7

A nylon lens (thickness: 1.5 mm, prepared from Polyamide resin T-714, manufactured by Toyo Boseki K.K.) is immersed in a surface hardner consisting of pentaerythritol tetraacrylate (40 parts), γ-methacryloxypropyltrimethoxysilane (0.8 part), methyl benzoylformate (0.6 part), benzil dimethyl ketal (0.4 part) and toluene (60 parts), and thereby, the surface of the nylon lens is coated with the surface hardner. The coated lens is dried at room temperature for 5 minutes and irradiated with a 80 W/cm high pressure mercury light from a distance of 15 cm for 45 seconds in an inert gas, wherein the irradiation is carried out from both sides of the concave surface and convex surface of the lens simultaneously, by which the coating layer is hardened.

The properties of the nylon lens having a hardner layer on the surface were measured. The results are as follows.
Impact resistance: 70 cm
Wear resistance: No injury
Adhesion test: 100/100 (repeated three times)
Pencil hardness: 3H

EXAMPLE 8

The same nylon lens (thickness: 1.5 mm) as used in Example 7 is immersed in a surface hardner consisting of pentaerythritol tetraacrylate (40 parts), allyltriethoxysilane (1 part), methyl benzoylformate (0.7 part), benzil dimethyl ketal (0.3 part) and toluene (60 parts). After drying at room temperature for 5 minutes, the coating layer is hardened in the same manner as described in Example 7.

The properties of the nylon lens having a hardner layer on the surface were measured. The results are as follows:
Impact resistance: 80 cm
Wear resistance: No injury
Adhesion test: 100/100 (repeated three times)
Pencil hardness: 2H-3H

EXAMPLE 9

The same nylon lens (thickness: 1.5 mm) as used in Example 7 is immersed in a surface hardner consisting of pentaerythritol tetraacrylate (40 parts), allyltriethoxysilane (1.0 part), benzil (0.5 part), benzil dimethyl ketal (0.5 part) and toluene (60 parts). The coating layer is hardened in the same manner as described in Example 7 without being dried at room temperature.

The properties of the nylon lens having a hardner layer on the surface were measured. The results are as follows.
Impact resistance: 70 cm
Wear resistance: No injury
Adhesion test: 100/100 (repeated three times)
Pencil hardness: 2H-3H

EXAMPLE 10

The same nylon lens (thickness: 1.5 mm) as used in Example 7 is immersed in a surface hardner consisting of pentaerythritol tetraacrylate (20 parts), dipentaerythritol hexaacrylate (20 parts), γ-methacryloyloxypropyltrimethoxysilane (1.0 part), methyl benzoylformate (0.5 part), benzil dimethyl ketal (0.5 part) and toluene (60 parts). The coating layer is hardened in the same manner as described in Example 7 without being dried at room temperature.

The properties of the nylon lens having a hardner layer on the surface were measured. The results are as follows.
Impact resistance: 65 cm
Wear resistance: No injury
Adhesion test: 100/100 (repeated three times)
Pencil hardness: 3H

EXAMPLE 11

In the same manner as described in Example 10 except that γ-methacryloyloxypropyltrimethoxysilane is used in an amount of 4 parts, the nylon lens is treated with a surface hardner.

The properties of the nylon lens having a hardner layer on the surface were measured. The results are as follows.
Impact resistance: 55 cm
Wear resistance: No injury
Adhesion test: 100/100 (the first test), 100/100 (the second test), 80/100 (the third test)
Pencil hardness: 3H

EXAMPLES 12 to 14

The same nylon lens (thickness: 1.5 mm) as used in Example 7 is immersed in a surface hardner consisting of pentaerythritol tetraacrylate (40 parts), a silane compound having at least one polymerizable unsaturated bond as shown in Table 2 (1 part), methyl benzoylformate (0.5 part), benzil dimethyl ketal (0.5 part) and toluene (60 parts). After drying at room temperature for 5 minutes, the coating layer is hardened in the same manner as described in Example 7.

The properties of the nylon lens having a hardner layer on the surface were measured. The results are shown in Table 2. As is clear from the results, these lens showed particularly excellent adhesion.

TABLE 2

| Ex. No. | Silane compound | Impact resistance (cm) | Hardness | Wear resistance | Adhesion First test | Second test | Third test |
| --- | --- | --- | --- | --- | --- | --- | --- |
| Ex. 12 | Vinyltriethoxysilane | 65 | 3H | No injury | 100/100 | 100/100 | 100/100 |
| Ex. 13 | Vinyltris(β-methoxyethoxy)silane | 75 | 2H-3H | No injury | 100/100 | 100/100 | 100/100 |
| Ex. 14 | Acryloyloxyethyltrimethoxysilane | 80 | 2H-3H | No injury | 100/100 | 100/100 | 100/100 |

What is claimed is:

1. A surface hardner for nylon lens, comprising (a) a polyfunctional acrylic ester monomer, (b) a photoinitiator, (c) a diluent, and (d) a silane compound, said photoinitiator consisting of a combination of a hydrogen abstraction type photoinitator audan α-clevage type photoinitator and being incorporated in an amount of 0.1 to 15 parts by weight to 100 parts by weight of the polyfunctional acrylic ester monomer, and said silane compound containing at least one polymerizable unsaturated bond is additionally incorporated in an amount of 0.1 to 10% by weight based on the weight of the polyfunctional acrylic ester monomer.

2. The surface hardner for nylon lens according to claim 1, wherein the silane compound is a member selected from the group consisting of allyl group-containing silane compounds, vinyl group-containing silane compounds, and (meth)acryloyl group-containing silane compounds.

3. The surface hardner for nylon lens according to claim 2, wherein the silane compound is a member selected from the group consisting of γ-methacryloyloxypropyltrimethoxysilane and γ-acryloyloxypropyltrimethoxysilane.

* * * * *